Dec. 19, 1939.   C. W. LEGUILLON   2,184,146
FLOORING
Filed Sept. 8, 1934
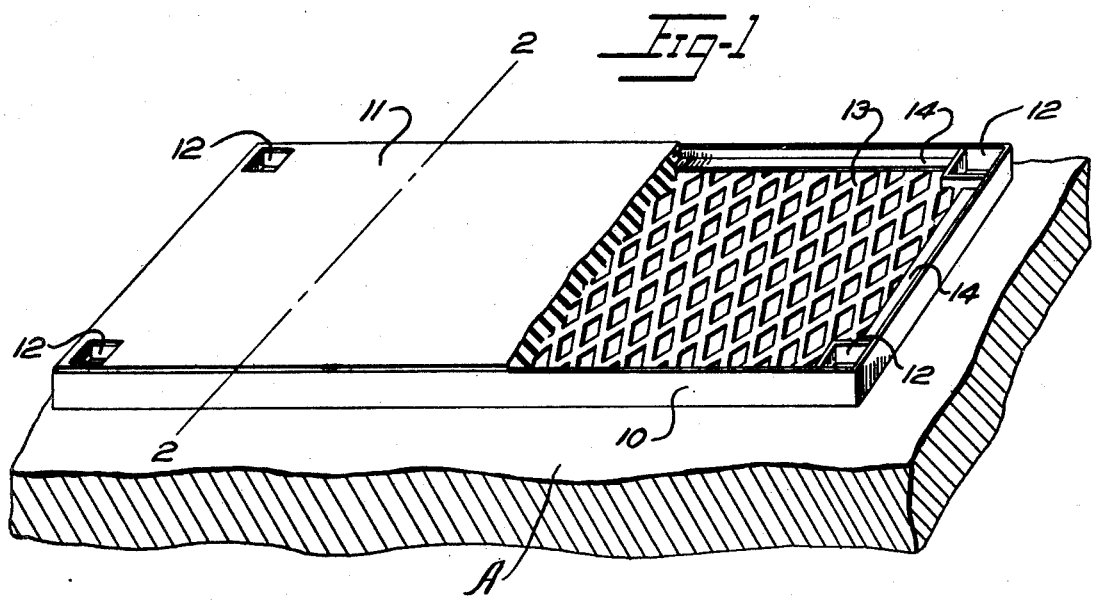
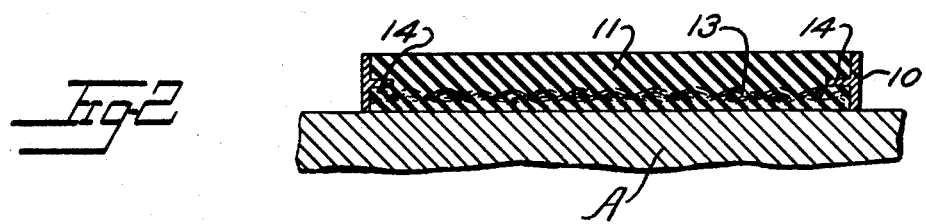
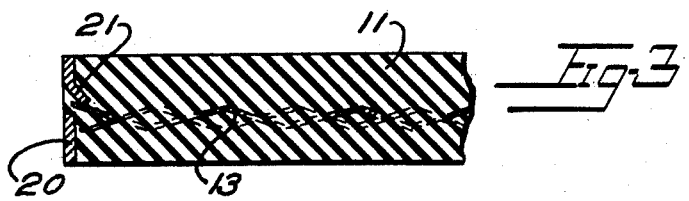
Inventor
Charles W. Leguillon
By Willis F. Avery
Atty.

Patented Dec. 19, 1939

2,184,146

UNITED STATES PATENT OFFICE 2,184,146

FLOORING

Charles W. Leguillon, Akron, Ohio, assignor to The B. F. Goodrich Company, New York, N. Y., a corporation of New York Application September 8, 1934, Serial No. 743,258

2 Claims. (Cl. 94—12)

This invention relates to flooring, and especially to flooring for bridges, roadways, industrial plants and in general all places subjected to heavy traffic, and severe climatic conditions.

Heretofore such flooring has commonly comprised concrete, or asphaltic or bituminous substances, and, in some cases, vulcanized rubber has been proposed. These have not been entirely satisfactory, however. The concrete is subject to being cracked or ruptured by severe shocks or vibration or by penetration and freezing of moisture or by temperature changes. The asphalt and bituminous substances are subject to the objectionable distortion of "cold flow", and especially are subject to distortion by flow in warm weather. The vulcanized rubber is subject to undesirably rapid aging by oxidation, cracking and disintegration.

The chief objects of the present invention are to provide a flooring that does not have the above discussed objectionable characteristics, and on the contrary is well able to withstand vibration, shock, freezing and heavy traffic, and to provide a flooring that will hold its original form in cold or hot weather, and possess a long lasting non-skid surface, and be highly repellent to moisture.

It is a further object to provide an improved reinforcement for such flooring that is well able to withstand heavy traffic without breakage or undesirable displacement of its elements.

This application is a continuation in part of my copending application, Serial No. 698,081, filed November 15, 1933, for Flooring.

These and other objects will be apparent from the following description, reference being had to the accompanying drawing in which:

Fig. 1 is a perspective view, with parts broken away, of a flooring element constructed according to and embodying the invention in its preferred form.

Fig. 2 is a section taken along the line 2—2 of Fig. 1.

Fig. 3 is a view like Fig. 2, but showing a modified construction.

Referring to Figs. 1 and 2, the flooring element, when it is to be used for very heavy vehicular traffic, preferably comprises a marginal frame 10 of a suitably strong material, such as metal, embracing a body 11 of composition, preferably the unvulcanized body of rubber composition hereinafter described. For securing the element to the bridge or other base (A), the frame may be formed with apertured pockets 12, 12 for the reception of suitable securing means, such as lag screws. A plurality of the elements may be laid side by side to constitute the flooring.

Within the body 11 is embedded a reinforcement 13, preferably of expanded metal as shown for a good interlock with the composition to resist relative movement, this being important especially with an unvulcanized composition which remains plastic, but other material may in some cases be used, such as wire, strips, screening or the like. In order to prevent breakage or undesirable displacement under the heavy moving pressure of vehicle wheels, the reinforcement 11 preferably is unattached at its margins to the frame, being held floating, rather, in the composition of the body. To the end that the margins of the reinforcement will not be flexed upward through the composition and eventually protrude from the face of the flooring under the severe load stresses of use, most of the load being downward at positions intermediate the margins, the frame 10 is provided with an inwardly extending marginal ledge 14, beneath which the margin of the reinforcement is disposed. The reinforcement is accordingly held securely in place and at the same time is permitted to yield sufficiently to avert the breakage that would be likely to occur if it were rigidly attached to the frame.

The body 11 of composition is pressed into the frame, preferably in the presence of heat to render the material more plastic. The frame 10 preferably is coextensive with the thickness of the composition so that the face of the element will be flush and so as to prevent lateral flow of the composition.

I have found that for the body 13 a composition comprising unvulcanized rubber containing substantially no free sulphur or other ingredient which might promote rapid oxidation, and containing a suitable toughening and slip resisting material, such as comminuted fibers or ground cork, intermixed with the rubber, is admirably suited to the fulfillment of the objects hereinbefore stated. Filler material, such as clay or slate flour, and a softener or plasticizing ingredient, such as oil, wax or resin, also are preferably included to increase the suitability of the composition for the purpose. When such composition is pressed into the frame of the flooring element, it possesses the desired characteristics of being highly resistant to objectionable alteration of its structure even when it is subjected to very severe conditions of traffic, weather, shock and vibration such as is encountered for example on bridges, and it is highly resistant to abrasion, slipping of vehicles upon it, and absorption of moisture. The non-slipping characteristic of the body surface apparently results to a large extent from the presence of the fibers in it, and its moisture repellent characteristic, despite the presence of the fibers, is contributed to by the presence of the rubber, which closely contacts the fibers, and also by the softeners, which apparently assist to water-proof the fibers.

The composition possesses some resilience and cushioning properties and also considerable ability to heal itself when cut or scratched at its surface.

Devulcanized reclaim rubber is highly satisfactory for the purpose of this invention, especially that obtained from such articles as old pneumatic tire carcasses, which contain a large proportion of high grade cotton fibers. It is preferred that the ground carcasses be devulcanized by a process such that the original fibers will not be destroyed but will be preserved in the final flooring body.

Good results may be obtained with a fiber content up to about one-half the total volume of the final composition. If desired, the fillers and softeners may be omitted, in which case the rubber will generally constitute a somewhat greater proportion of the total volume, but it is preferred to use some mineral fillers in order to toughen the composition, and to use waxes or other softeners to facilitate mixing and to increase the resistance to penetration of moisture.

A specific embodiment which has given good results has comprised about 32 percent devulcanized reclaim rubber by volume of the final composition, about 24 per cent fibers, about 16 per cent softeners such as bitumens and waxes, and about 28 percent pulverulent filler such as clay, whiting and red oxide, the oxide being included principally as a pigment.

It will be understood that the ingredients and proportions thereof may be varied considerably and that this example is intended to be illustrative and not wholly limiting.

With reference to the modification of Fig. 3, instead of the T-shaped section of the frame of the first embodiment, the frame may be of flat strip metal 20 from which lugs 21 may be struck out to provide inward projections to resist upward movement of the margin of the reinforcement.

By the combination of the improved body composition having the advantages above discussed and the improved reinforcing structure, a flooring is provided that is capable of withstanding successfully very heavy vehicular traffic and very severe weather conditions.

I claim:

1. A paving comprising a pressed body of resilient, slightly flowable, self-healing, permanently unvulcanized rubber composition containing a comminuted material, a rigid frame member enclosing the composition, and an open-work metallic reinforcement embedded in the composition and unattached to said frame member, said frame member having inwardly projecting means overlying the margins of the reinforcement limiting upward movement of said margins.

2. A paving slab comprising a pressed body of composition subject to distortion under a moving vehicular load, a rigid frame member enclosing the composition, and an open-work metallic reinforcement embedded in the composition and unattached to said frame member, said frame member having inwardly projecting means overlying the margins of the reinforcement limiting upward movement of said margins.

CHARLES W. LEGUILLON.